May 17, 1932. E. N. KERR 1,859,145
CHAIN PROPELLER
Filed Dec. 21, 1931 2 Sheets-Sheet 1

Inventor
ERNEST N. KERR

May 17, 1932.  E. N. KERR  1,859,145
CHAIN PROPELLER
Filed Dec. 21, 1931  2 Sheets-Sheet 2
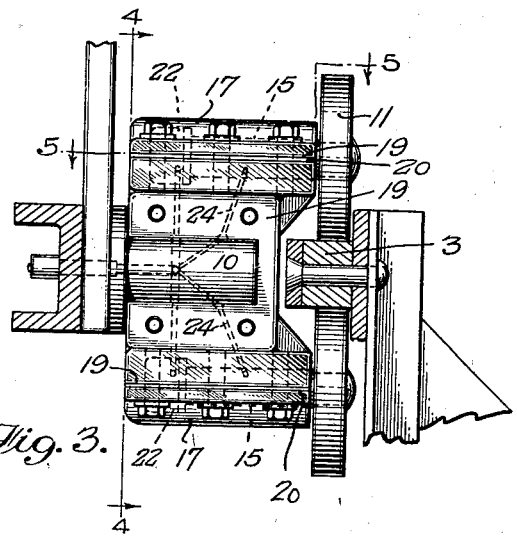
Fig. 3.
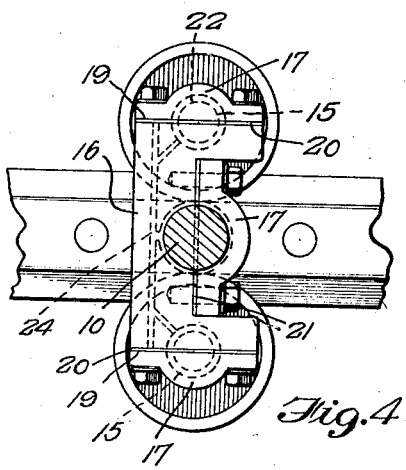
Fig. 4.
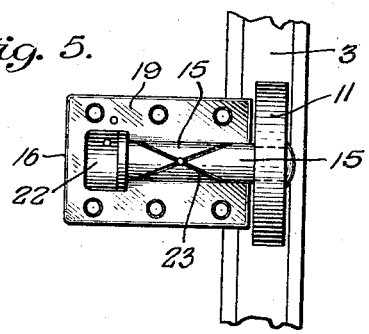
Fig. 5.
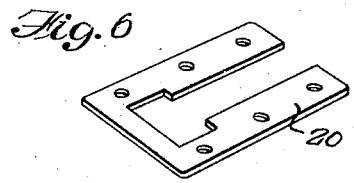
Fig. 6.
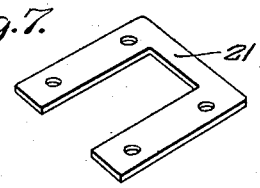
Fig. 7.
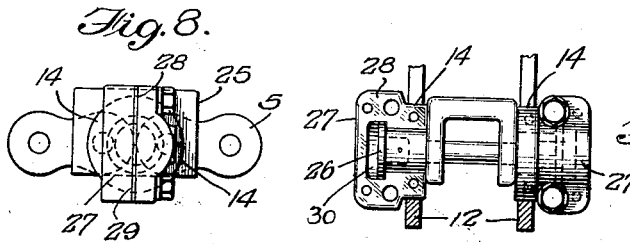
Fig. 8.  Fig. 9.
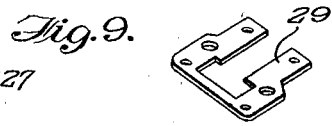
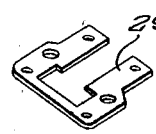
Fig. 10.
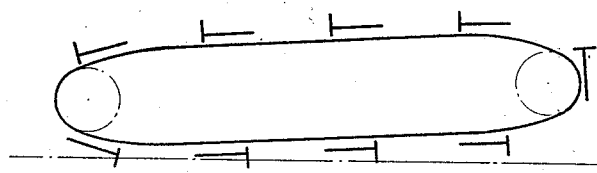
Fig. 11.
Inventor
ERNEST N. KERR.
E. W. Anderson Son
Attorney Patented May 17, 1932

1,859,145

UNITED STATES PATENT OFFICE

ERNEST N. KERR, OF BLOOMINGTON, ILLINOIS

CHAIN PROPELLER

Application filed December 21, 1931. Serial No. 582,470.

The invention has relation to chain propellers, having for an object to provide certain improvements upon the chain propeller of the Patent No. 1,489,218, dated April 1, 1924.

One object of the invention is to reduce the driving diameter of the propeller, thereby increasing its efficiency. Another object is to provide the trucks with parallel upper and lower wheels and wheel shafts, thereby equalizing the strain thereon. Another object is to adapt the bearings of the truck pivots and of the wheel shafts, and the bearings of the pins of the pin and slot connections, for the use of U-form shims for water sealing purposes. Other objects and advantages will hereinafter appear.

The invention consists in the novel construction and combinations of parts as set forth in the appended claims.

In the accompanying drawings illustrating the invention

Figure 3 is a detail rear of one of the trucks, etc.

Figure 4 is a section on the line 4—4, Figure 3.

Figure 5 is a section on the line 5—5, Figure 3.

Figure 6 is a detail perspective view of one of the shims for the truck wheel shaft bearings.

Figure 7 is a similar view of one of the shims for the truck pivot bearings.

Figure 8 is a detail side view of the bearing block for one of the stub shafts of the chain and carriage connection.

Figure 9 is a rear view of the same with one bearing cap removed.

Figure 10 is a detail perspective view of the shim for a stub shaft bearing of this connection.

Figure 11 is a diagrammatic view of a propeller of greater length.

Figure 1:
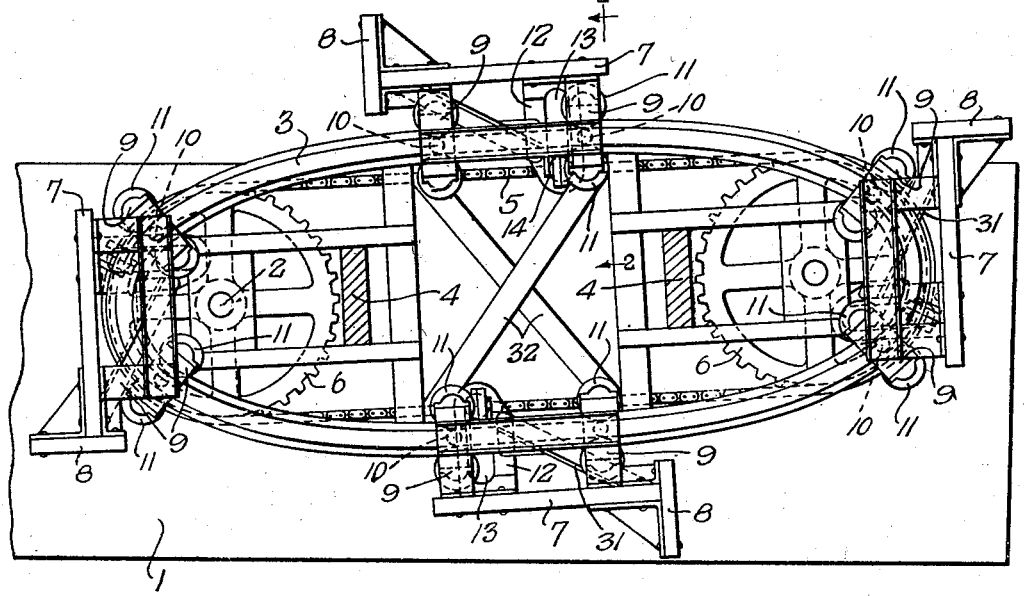
Figure 1 is a side view of the invention.
Figure 2:
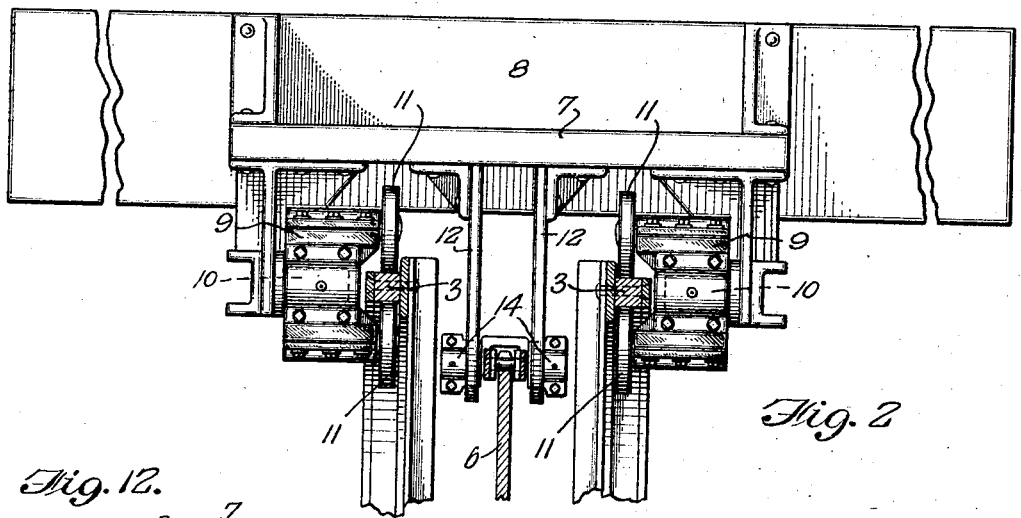
Figure 2 is a section on the line 2—2, Figure 1.
Figure 12:
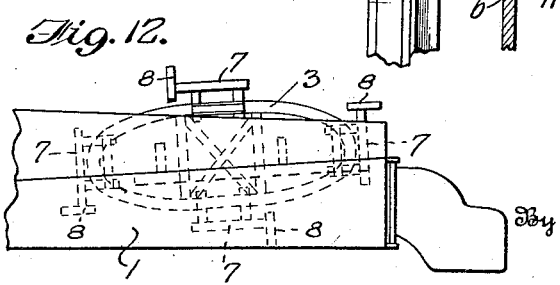
Figure 12 is a side view of the propeller, partly diagrammatic, showing propeller inset in cut in stern of the boat.

In these drawings, the numeral 1 designates the hull of a boat to which the propeller is shown as applied, 2 is the power shaft, and 3 are the endless elongated tracks, having support at 4 from the boat hull, and spaced apart horizontally. Located between these spaced tracks, is sprocket gearing, including a chain 5, passing over sprocket wheels 6, one at each end of said tracks, one of said wheels being mounted upon the power shaft 2. Driven by the sprocket gearing are a plurality of carriages 7, having each a paddle blade 8, the blades of the several carriages being parallel and horizontally spaced, except when passing around the curved ends of the tracks. Each carriage is provided with trucks 9, one at each side thereof and pivoted respectively to the carriage at 10, the trucks being pivotally movable with respect to the related carriages in passing around the curved ends of the tracks, and having each upper and lower wheels 11, traveling upon the upper and lower endless bearing surfaces of said tracks.

The tracks 3 are of elliptical form, so far as their ends are concerned, whereby the upper and lower stretches of the tracks are spaced outwardly from the upper and lower stretches of the driving chain 5, and strain upon the trucks is relieved when the propeller is run at high speed owing to the more gradual change of position of the trucks in rounding the ends of the tracks. Each carriage has a pin and slot driving connection with the chain 5, including duplicate inwardly extending members 12, one at each side of said chain, and having each a slot 13, wherein works a pin or wheel 14.

The paddle blade or bucket 8 of each carriage is located at the forward end thereof, and projects inwardly past the forward end of the longitudinal main frame or support 7 of the carriage to position adjacent the track 3, said support and blade together being of T-form, the carriage proper following in part in the wake of said blade, thereby reducing the driving diameter and increasing efficiency.

The upper and lower wheels of the trucks 9 are parallel to each other, as are also the shafts 15 whereon said wheels are mounted and the upper and lower endless bearing surfaces of the tracks 3, thereby equalizing the strain upon said shafts and said wheels.

The bearing blocks for the truck pivot shafts 10, and the wheel shafts 15 are adapted for the use of U-form shims for water sealing purposes, and comprise body members 16, which with the bearing caps 17, have longitudinal U-form abutting surfaces 19, U-form shims 20 and 21 being engaged with said abutting surfaces. Each bearing block is provided with an oil pocket 22, located at the inner end of each wheel shaft, said pocket being located one half in the body member and one half in the cap and being embraced on three sides thereof by the related U-form shim, each wheel shaft being provided with oil conducting grooves 23, and the bearing block having oil conducting grooves 24. Water can do no injury by any entry thereof that may occur at the wheel ends of the shafts, as these shafts are of non-tarnishing steel and the water cannot wash out the oil, the bearings being otherwise sealed against entry of water by the U-form shims.

The pin and slot connection between the sprocket gearing and each carriage includes a member 25, forming a link of the chain of said gearing, said member having opposite stub shafts 26, a two-part bearing block 27 engaging each stub shaft having U-form abutting surfaces 28 engaged by U-form shims 29, the pin or wheel 14 working in the slot of said connection being located at the inner end of said bearing block and also in two parts with the shims located therebetween. An oil pocket 30 is located in the bearing block at the outer end of each stub shaft 26, said pocket being located one half in each block member with the shims therebetween, the pocket being embraced on three sides thereof by the shims. The pin or wheel 14 is shown as an integral part of the bearing block and the stub shaft bearings are sealed against entry of water by the U-form shims. The purpose of the bearing blocks 27 is to enable the wheels 14 to be freely rotatable and to lubricate the stub shaft bearings on which said wheels rotate.

The inwardly extending members 12 of the pin and slot connections between the sprocket gearing and each carriage are located at the rear end of the carriage and are provided each with an outwardly inclined strut 31 between the inner end of said member and the forward end of the longitudinal support 7 of the carriage, whereby the driving strain is more directly transmitted to the related paddle blade. Each track is braced at 32 on the inside thereof.

The rigid endless tracks form the backbone of the propeller, being intended to sustain the great weight between the sprocket wheels and to provide a base from which the paddle blades or buckets kick. These tracks allow the drive chain to hang on the sprockets free from all tension other than its own weight and the driving stresses.

It is found in practice that this propeller enables the revolutions per minute to be increased with gain of efficiency, whereas in the case of the ordinary paddle wheel as is well known efficiency is lost with increase of the R. P. M. The straight portions of the tracks between the elliptical ends thereof are of varying length, thereby admitting of increase of the number of carriages and paddle blades or buckets in accord with requirements. This propeller supplies the need for use in shallow water of a propulsion means having propelling surface adapted to be increased in accord with requirements.

The rigid endless tracks are provided with suitable reinforcement at 32, and having bolt connection with the support thereof, are adapted for replacement when needed. The link pins of the member 25 forming a link of the chain of the sprocket gearing are held in place by the wheels 14 of the bearing blocks 27.

I claim:—

1. In a chain propeller having opposite endless elliptical tracks, a plurality of carriages having each a longitudinal support, bearing members hung from said support, trucks having pivotal bearing in said members and provided with upper and lower wheels engaging said tracks, a paddle blade carried by said support, and sprocket gearing having operative connection with said carriages; the paddle blade of each carriage projecting inwardly past the forward end of its support to a position adjacent said track, the support and blade together being of T-form, and the carriage following in the wake of its paddle blade.

2. In a chain propeller having opposite endless elliptical tracks, a plurality of carriages having each a longitudinal support, bearing members hung from said support, trucks having pivotal bearing in said members and provided with upper and lower wheels engaging said tracks, a paddle blade carried by said support, and sprocket gearing having operative connection with said carriages; the paddle blade of each carriage projecting inwardly past the forward end of said support to a position adjacent said tracks, the support and its blade together being of T-form, and the carriage following in the wake of its paddle blade, the upper and lower wheels of the trucks being parallel to each other and having shafts parallel to each other and having bearings in said trucks.

3. In a chain propeller having opposite endless elliptical tracks, a plurality of carriages having each a longitudinal support, bearing members hung from said support, trucks having pivotal bearings in said members and provided with upper and lower wheels engaging said tracks, a paddle blade carried by said support, and sprocket gearing having operative slot and pin connection with said carriages; the paddle blade of each carriage projecting inwardly past the forward end of said support to a position adjacent said track, the support and blade together being of T-form, the carriage following in the wake of the its paddle blade, said slot and pin connection being located at the rear of the carriage and having an outwardly inclined strut between the inner end of the same and the forward end of said support.

4. In a chain propeller having opposite endless elliptical tracks, a plurality of carriages having each a longitudinal support, bearing members hung from said support, trucks having pivotal bearing in said members and provided with upper and lower wheels engaging said tracks, a paddle blade carried by said support, and sprocket gearing having operative slot and pin connection with said carriages; said connection including a member having opposite stub shafts and forming a link of the chain of said gearing, and bearing blocks engaging said stub shafts, the pins of said connection being carried by said bearing blocks.

5. In a chain propeller having opposite endless elliptical tracks, a plurality of carriages having each a longitudinal support, bearing members hung from said support, trucks having pivotal bearing in said members and provided with upper and lower wheels engaging said tracks, a paddle blade carried by said support, and sprocket gearing having operative slot and pin connection with said carriages; said connection including a member having opposite stub shafts and forming a link of the chain of said gearing, and two-part bearing blocks engaging said stub shafts and having each U-form abutting surfaces, and U-form shims engaging said abutting surfaces, the pins of said connection being carried by said bearing blocks.

6. In a chain propeller having opposite endless elliptical tracks, a plurality of carriages having each a longitudinal support, bearing members hung from said support, trucks having pivotal bearing in said members and provided with upper and lower wheels engaging said tracks, a paddle blade carried by said support, and sprocket gearing having operative slot and pin connection with said carriages; said connection including a member having opposite stub shafts and forming a link of the chain of said gearing, two-part bearing blocks engaging said stub shafts and having each U-form abutting surfaces, U-form shims engaging said abutting surfaces, said bearing blocks having each a two-part oil pocket located at the outer end of the related stub shaft and embraced on three sides thereof by said shims, the pins of said connection being carried by said bearing blocks.

7. In a chain propeller having opposite endless elliptical tracks, a plurality of carriages having each a longitudinal support, bearing members hung from said support, trucks having pivotal bearing in said members and provided with upper and lower wheels engaging said tracks, a paddle blade carried by said support, and sprocket gearing having operative connection with said carriages; said pivotal bearings and the bearings for the shafts of said wheels including bearing blocks having each longitudinal U-form abutting surfaces and transverse U-form abutting surfaces, and U-form shims engaging said abutting surfaces.

8. In a chain propeller having opposite endless elliptical tracks, a plurality of carriages having each a longitudinal support, bearing members hung from said support, trucks, having pivotal bearings in said members and provided with upper and lower wheels engaging said tracks, a paddle blade carried by said support, and sprocket gearing having operative connection with said carriages; said pivotal bearings and the bearings for the shafts of said wheels including bearing blocks having each longitudinal U-form abutting surfaces and transverse U-form abutting surfaces, and U-form shims engaging said abutting surfaces, said bearing blocks having each upper and lower two-part oil pockets located at the outer ends of the shafts of said wheels and embraced on three sides thereof by said shims.

In testimony whereof I affix my signature.

ERNEST N. KERR.